March 9, 1948.  J. KUCHAR  2,437,607
HITCH
Filed May 14, 1945  2 Sheets-Sheet 1
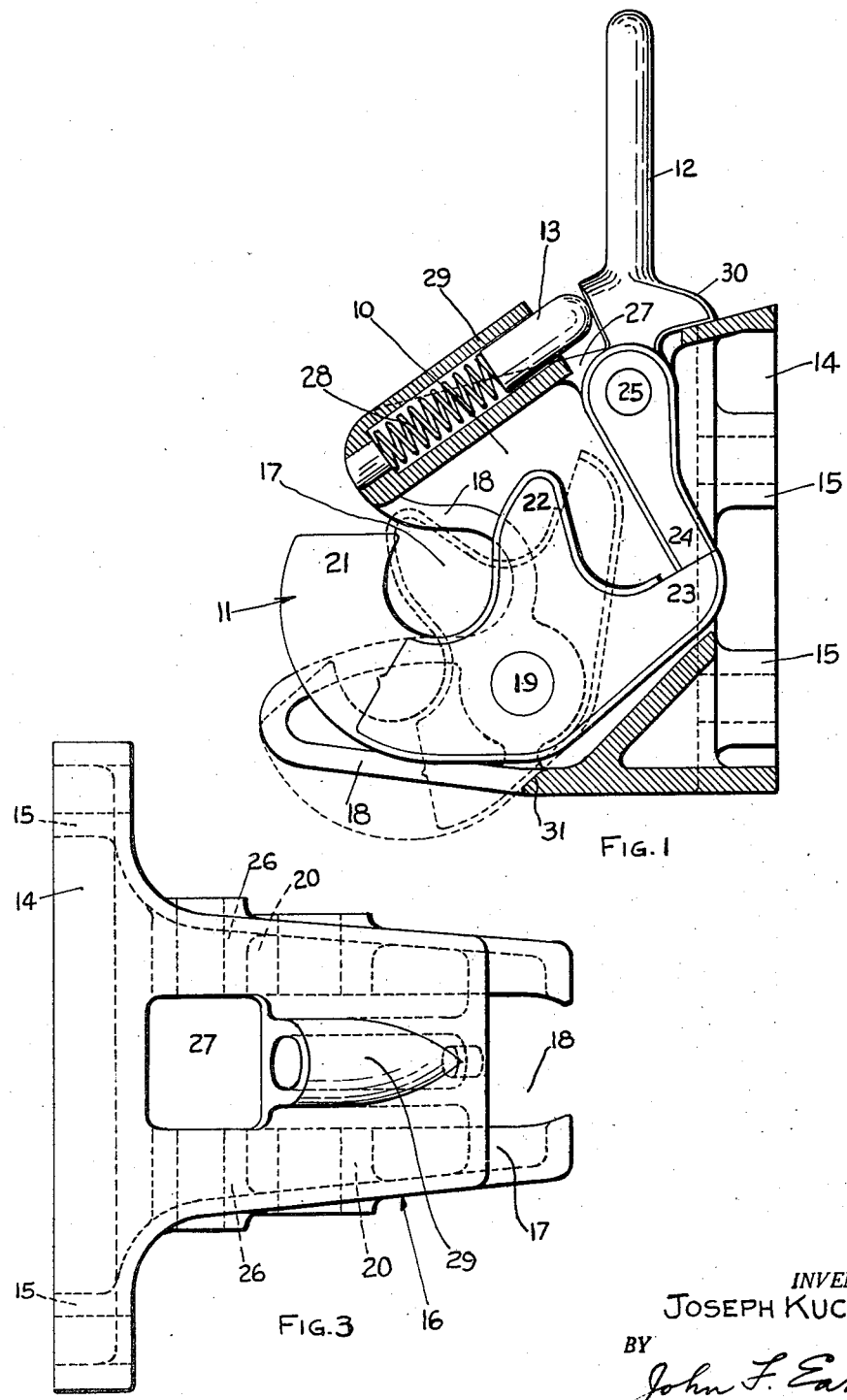
INVENTOR.
JOSEPH KUCHAR
BY John F. Eakins
Atty.

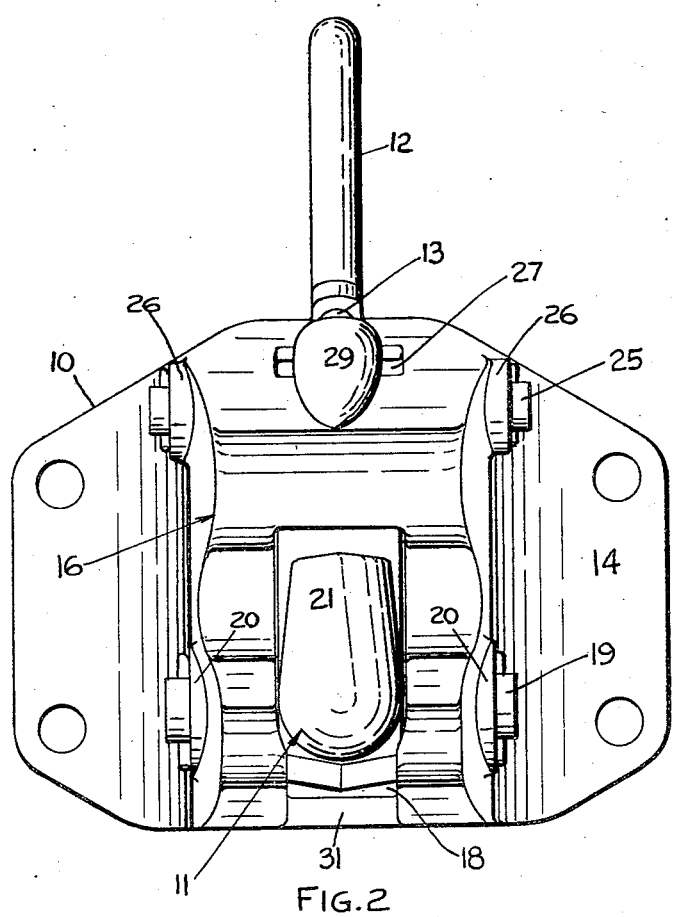

Patented Mar. 9, 1948

2,437,607

UNITED STATES PATENT OFFICE 2,437,607

HITCH

Joseph Kuchar, Chicago, Ill.

Application May 14, 1945, Serial No. 593,686

1 Claim. (Cl. 280—33.15)

This invention relates to hitches and has for its principal object to provide a hitch capable of automatic engagement and coupling, and capable of being released manually with complete safety to the operator by simple movement of a member remote from the operating elements.

The hitch is intended for the purpose of connecting two vehicles together. One vehicle may have a conventional hitch element such as an eye carried on a projecting tongue. The other hitch element, with which this invention is primarily concerned, receives this eye by means of a movable hook member which is held in operative position by a thrust latch in the form of a relatively long lever projecting upwardly clear of all other mechanisms. The latch is biassed towards latching position and the hook member is biassed away from latched operative position, so that the hitch can be disengaged by merely striking the long projecting upper end of the latch by hand. In its inoperative position the hook is positioned so that it may be engaged by a complementary hitch element, for example by means of relative movement of the vehicles, and carried into its operative position, in which it is retained by the latch.

One of the principal advantages of the present invention is the safety of the hitch in use. Where heavy vehicles are concerned, previous hitches have always been dangerous and many people have lost fingers in manipulating elements near the load carrying elements. In the present hitch, the sole actuating member is a long lever which projects away from the hitch elements proper and is arranged to be actuated by a bang of the palm. The favorable leverage invites even the most careless users to hit the extremity of the lever so that the hand is always clear of hitch elements which might cause injury.

Further objects, advantages and capabilities of the invention will appear from the following description of a preferred embodiment thereof taken in conjunction with the accompanying drawings, in which, Fig. 1 is a sectional elevation of my improved hitch member;

Fig. 2 is a front elevation thereof; and

Fig. 3 is a plan view of the housing thereof.

Referring to the drawings the hitch element comprises a supporting housing 10, a hook member 11, a latch lever 12 and a spring pressed plunger 13 which biasses the lever 12 towards latching position.

The housing 10 may suitably be a casting and includes a base portion 14 which may be secured to a vehicle by means of bolts which may extend through bosses 15 in the base. The base 14 gives into the horizontally projecting, generally tapering muzzle-like portion 16. The projecting portion 16 of the housing 10 is provided at its outer end with a horizontal recess 17 which has the general appearance of an open mouth when the structure is viewed in elevation. The walls adjacent the recess 17 are gently curved so that an eye or complementary hitch element carried by another vehicle may be guided into the inner end of the recess 17 by relative movement of the vehicles.

The housing 10 is provided with a central vertical slot 18 which extends through the recess 17 and along the bottom wall of the housing to provide for the movements of the hook member 11.

The hook member 11 is pivotally mounted by means of pin 19 carried by bosses 20 on the housing 10 adjacent the inner end of the recess 17. The hook member includes a hitching hook arm 21, a cocking arm 22 and a latching arm 23. When the hook member 11 is in normal operative position as shown in full lines in Fig. 1, the arm 21 practically closes the recess 17 so that a complementary hitch element may be secured in the recess 17 in traction transfer relation with the arm 21. In this position of the hook member 11, the arm 23 is engaged by the lower end 24 of the latch lever 12. The lever 12 is pivotally mounted by means of a pin 25 mounted in bosses 26 near the upper end of the housing 10 which is provided with an opening 27 through which the lever extends upwardly. As best seen in Fig. 1, the normal projection of the engaging surfaces of the arm 23 and end 24 lies to the left of the pivotal axis of the lever so that the pressure applied by the load on the lever 12 tends to carry the lever in the clockwise direction. The lever is biassed towards its latching position by the spring pressed plunger 13, which together with its spring 28 are located in a cylindrical housing 29 carried by the housing 10 between the openings 18 and 27. A projection 30 on the lever 12 engages the housing 10 to define its latching position.

When the lever 12 is moved in counterclockwise direction as viewed in Fig. 1 by manual force applied to its upper end, the spring 28 is compressed and the lower end 24 of the lever 12 is carried clear of the arm 23 of the hook member 11, so that this member is free to fall by gravity into its dot and dash position in Fig. 1. In this position, which is defined by engagement of the hook member with the abutment 31 at the end of the slot 18, the hook arm 21 is carried below the recess 17 and the cocking arm 22 moves within the slot 18 from its normal position near the inner end of the recess into an outward position therein. The lever 12 on manual release is moved by the spring pressed plunger 13 into engagement with the end of the arm 23. The hitch elements are now conditioned for automatic hitching. Thus if the vehicle carrying this hitch is backed to bring the eye of a complementary hitch member on another vehicle into the recess 17, the eye engages the cocking arm 22 and swings the hook member 11 to its normal position bringing the hitching hook arm 21 up behind the engaged portion of the eye. The same movement of the hook member 11 carries its arm 23 clear of the end of the latch lever 12 so that this lever is snapped into latching position by the plunger 13.

Thus it will be fully understood that the only actuation which the hitch member requires is a single displacement of the lever 12 for unhitching and that this actuation is effected at a position clear of all the hitch elements which might injure the user's hand.

I declare that what I claim is:

A hitching mechanism arranged for automatic hitching and safe manual unhitching with and from a complementary hitching element, comprising a body having lower and upper spaced jaw portions defining an outwardly opening mouth, a member pivotally mounted on the lower part of the body including a hook portion, a cocking arm, and a latching face, said member being biassed towards unhitched condition, a latching lever having a relatively short lower arm arranged to abut against said face to latch said member in hitching condition and a relatively long upper arm extending upwardly clear of the other hitching elements so that its favorable leverage invites manual actuation at its upper end with the operator's hand remote from the other hitch elements, means biassing said lever towards latching position, said latching lever being arranged to engage said face and hold said member with the hook portion effectually bridging the mouth so as to enclose a complementary hitching element therein and with the cocking lever near the inner end of the mouth, and means on said body engaging said member when unlatched to locate the hook member clear of the upper contour of the lower jaw and clear of the mouth, and with the cocking arm in an outward position substantially bridging the mouth, whereby the hitching mechanism may be backed on to a complementary hitching element in such manner that the cocking arm is moved inwardly towards the inner end of the mouth until the latch engages said face holding the hook portion in hitching relation.

JOSEPH KUCHAR.

REFERENCES CITED

The following references are of record in the file of this patent:

UNITED STATES PATENTS

| Number | Name | Date |
| --- | --- | --- |
| 1,537,935 | Clark | May 19, 1925 |
| 1,588,942 | Clark | June 15, 1926 |
| 1,824,843 | Staley | Sept. 29, 1931 |